United States Patent [19]

Witt, III

[11] Patent Number: 5,660,549

[45] Date of Patent: Aug. 26, 1997

[54] FIREFIGHTER TRAINING SIMULATOR

[75] Inventor: Frank A. Witt, III, West Columbia, S.C.

[73] Assignee: Flameco, Inc., Mission Viejo, Calif.

[21] Appl. No.: 377,326

[22] Filed: Jan. 23, 1995

[51] Int. Cl.⁶ .............................. G09B 9/00; G09B 9/14
[52] U.S. Cl. .............................. 434/226; 434/36; 434/41; 434/21; 434/22
[58] Field of Search .............................. 434/226, 21, 22, 434/36, 41, 43

[56] References Cited

U.S. PATENT DOCUMENTS

| | | |
|---|---|---|
| 3,245,315 | 4/1966 | Marks et al. . |
| 3,575,493 | 4/1971 | Heilmeier . |
| 3,647,279 | 3/1972 | Sharpless et al. .................... 359/37 |
| 3,749,474 | 7/1973 | Cartmell . |
| 3,873,804 | 3/1975 | Gordon . |
| 4,021,935 | 5/1977 | Witt . |
| 4,039,803 | 8/1977 | Harsch . |
| 4,043,639 | 8/1977 | Matsuyama et al. . |
| 4,066,334 | 1/1978 | Fray et al. . |
| 4,106,217 | 8/1978 | Witt . |
| 4,152,846 | 5/1979 | Witt . |
| 4,155,122 | 5/1979 | Budmiger . |
| 4,237,557 | 12/1980 | Gordon . |
| 4,279,474 | 7/1981 | Belgorod . |
| 4,462,661 | 7/1984 | Witt . |
| 4,482,326 | 11/1984 | Witt . |
| 4,511,225 | 4/1985 | Lipson . |
| 4,560,239 | 12/1985 | Katz . |
| 4,595,262 | 6/1986 | Ogle . |
| 5,006,072 | 4/1991 | Letovsky et al. ................ 434/61 |
| 5,081,542 | 1/1992 | Efron et al. . |
| 5,420,828 | 5/1995 | Geiger ............................ 367/131 |

Primary Examiner—Richard J. Apley
Assistant Examiner—John E. Rovnak, Jr.
Attorney, Agent, or Firm—McAndrews, Held & Malloy, Ltd.

[57] ABSTRACT

Firefighter training device for limiting a trainee's vision and simulating firefighting conditions across a trainee's field of view. The device includes a view-limiting simulation mask which is worn by a trainee (e.g., respirator mask, glasses, or goggles). The mask houses a voltage controlled liquid crystal (LC) lens system, either single or multi-layered, which is divided into various individually and electronically controllable segments. Host dyes might be injected into LC materials to produce colors in the lens segments. Pre-programmed and random pattern control of lens segments occludes the trainee's vision and simulates smoke and/or fires. Sound and strobes might be added to simulate explosions and other firefighting conditions. A transmitter, which includes switchable controls, can be used to send control signals to the mask. The training device can effectively be used indoors or outdoors. Audio devices may accompany the visual trainer, providing alarms and simulating the sounds of actual firefighting conditions.

43 Claims, 11 Drawing Sheets

FIREFIGHTER TRAINING SIMULATOR

BACKGOUND OF THE INVENTION

1. Field of the Invention

The present invention relates to a firemen's training device for simulation of smoke, fires, and explosions which might impair a firefighter's vision, and the generation of accompanying audio signals to coincide with the visual simulations.

2. Description of the Prior Art

In the area of firefighter training, one objective of training devices is to occlude the trainee's visual references. This will teach the trainee to fight fires and to find trapped occupants in burning and smoke-filled environments.

Previous methods of simulating actual field conditions have included the intentional burning of, for example, old tires, used oil, and old buildings. Such intentional burning of often dangerous and toxic substances is now prohibited in most areas because of environmental and safety concerns. Communities wish to avoid the pollution resulting from such intentional fires, as well as the possibility of such fires spreading.

Alternatively, smoke machines and smoke bombs can be used, but little control over the location and density of the smoke is possible with these devices. Often the wind will carry smoke from a training area, thus rendering the training exercise ineffective and polluting surrounding areas or shutting down assembly lines or other production areas.

Some fire departments use darkened rooms, and will primitively simulate a fire by placing a colored sock over a flashlight. Still other departments place waxed paper over the firefighter's respirator mask to simulate smoke and fire.

Liquid crystal (LC) lenses are voltage controlled devices whose opacity can be varied. LC lensed glasses have previously been used in flight training situations to simulate cloud cover (See this inventor's U.S. Pat. Nos. 4,152,846—Flight Training Method and Apparatus; 4,482,386—Flight Training Glasses). Firefighting conditions and simulations thereof, however, are dramatically different than flight conditions.

As a result, none of the prior methods effectively simulates the dynamically changing conditions most often encountered by firefighters in the field. Prior simulated training conditions are difficult or impossible to accurately control and/or duplicate. Accordingly, standardization of testing conditions is difficult and/or impossible to achieve.

SUMMARY OF THE INVENTION

It is an objective of the present invention to provide an apparatus for firefighter training which includes a transmitter and a view-limiting simulation device (training mask, glasses, or goggles) with a receiver/controller for receiving and decoding transmitted signals. The simulation device, as driven by the decoded signals, includes a voltage controlled liquid crystal (LC) lens for controlled occlusion of the trainee's view, and for simulating fire, smoke, explosions, and related audio alarms.

It is a further object of the present invention to provide a portable apparatus which allows a trainee to realistically train inside of training areas (e.g. fire halls, academies, special facilities, schools, office buildings, factories, aircraft, ships, etc.) without smoke-polluting and/or setting aflame the training areas and surrounding areas.

It is a further object of the present invention to provide a training system which utilizes radio transmissions to send instruction signals between the instructor and the trainee's simulation device.

It is yet a further object of the present invention to provide a training system which utilizes light frequency patterns to send instruction signals to the trainee's view-limiting simulation device, thus allowing a trainee's simulated view to vary with the trainee's orientation in a training environment with multiple light pattern sources.

It is yet another object of the present invention to provide a training system which utilizes both visual and audio simulation of firefighting conditions (e.g. sights and sounds of fire, wind, and explosions) to work in concert with each other.

It is yet another object of the present invention to provide a training system with visual occlusion and simulation of fire fighting conditions, as well as accompanying projection systems for simulating fires so as to provide for more realistic training experiences.

DESCRIPTION OF THE PREFERRED EMBODIMENTS

Figure 1:
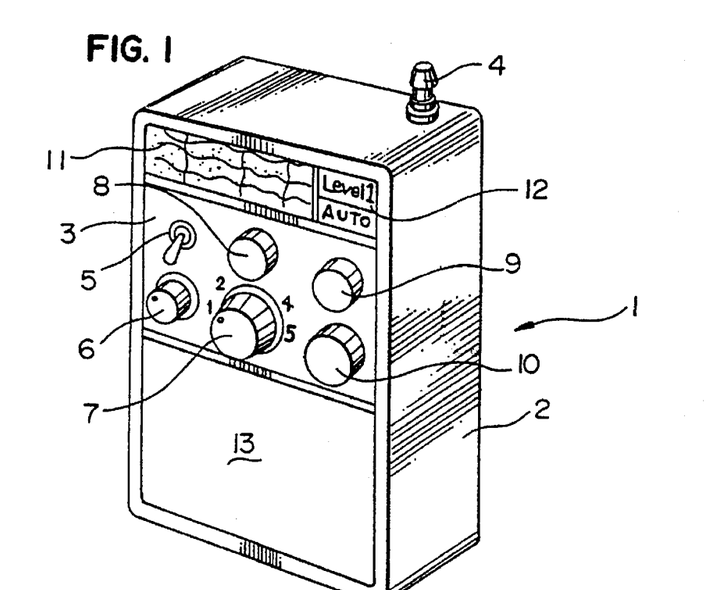
FIG. 1 is a transmitter/controller which can be configured to a cable-tethered device or separate transmission medium system such as radio, light patterns (infrared—IR), or sonar.
Figure 2:
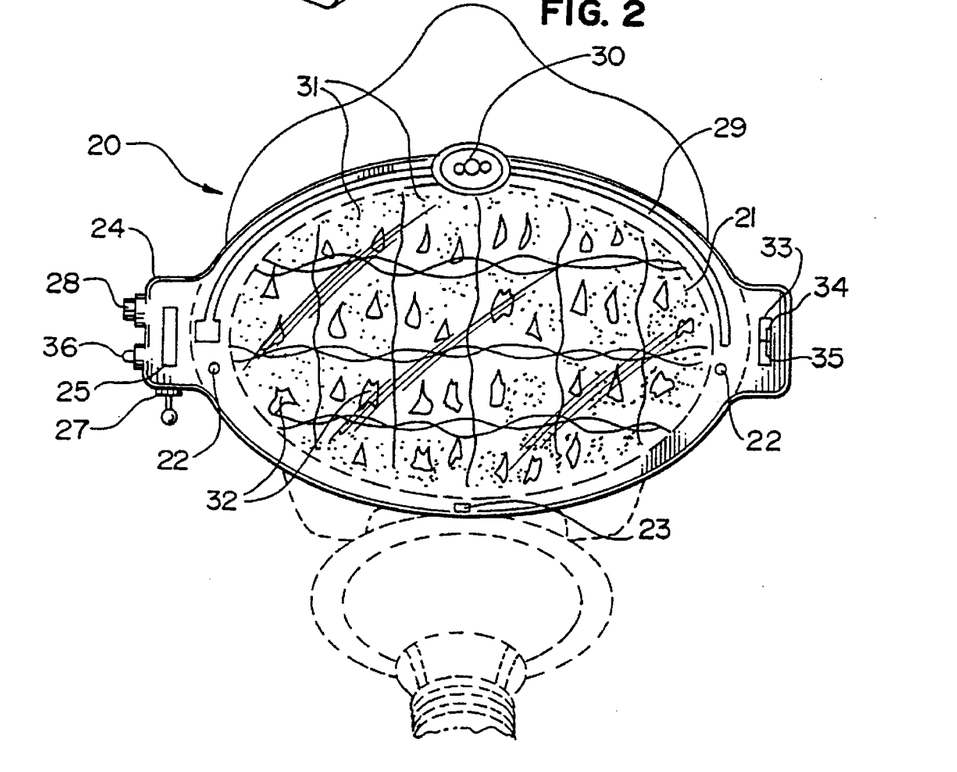
FIG. 2 is a typical respirator-type view-limiting simulation device used by firemen (with related attachments in fathom).

Referring to FIGS. 1 and 2, a firemen's training simulator includes a transmitter 1 used by an instructor in conjunction with a view-limiting simulation device 20 worn by a trainee (not shown). The signals between transmitter 1 and view-limiting simulation device 20 can be transmitted and received via any conventional medium (e.g. light signals— IR or visible; sonar; radio waves; and/or electrical or fiber-optic signals through cable). The preferred embodiment uses Frequency Modulated (FM) radio waves.

Transmitter 1 includes an external housing 2 for containing the transmitter circuitry. Transmitter 1 further includes a control panel 3 for operation and control of view-limiting simulation device 20, and an antenna 4 for transmitting FM radio waves to view-limiting simulation device 20.

Control panel 3 includes an ON-OFF switch 5 for controlling supply of power to transmitter 1. Control panel 3 further includes a first See-through liquid-crystal (LC) lens 11 which provides the instructor with visual confirmation of the simulation that the trainee is currently viewing. LC lens 11 matches, in miniature, an LC lens 21 of view-limiting simulation device 20 as worn by the trainee.

Figure 15:
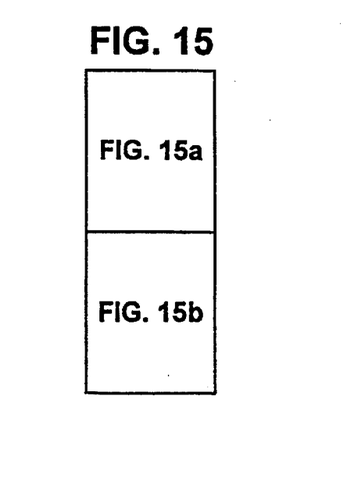
FIGS. 15A and 15B collectively illustrate a flowchart of a representative program which might run the switch-sampling and memory-access processes of the transmitter/controller or receiver/controller and associated microprocessors.
Figure 15A:
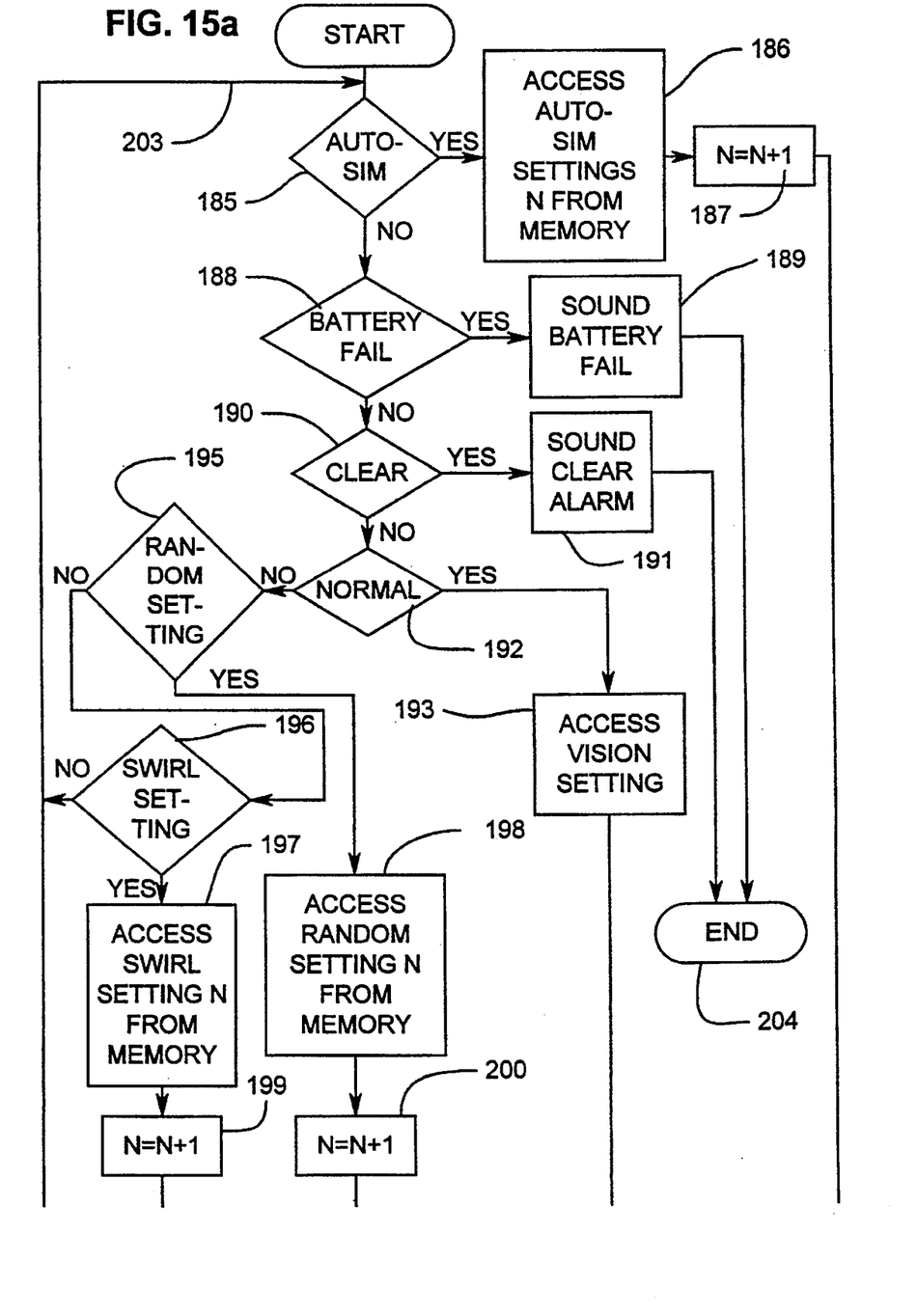
Figure 15B:
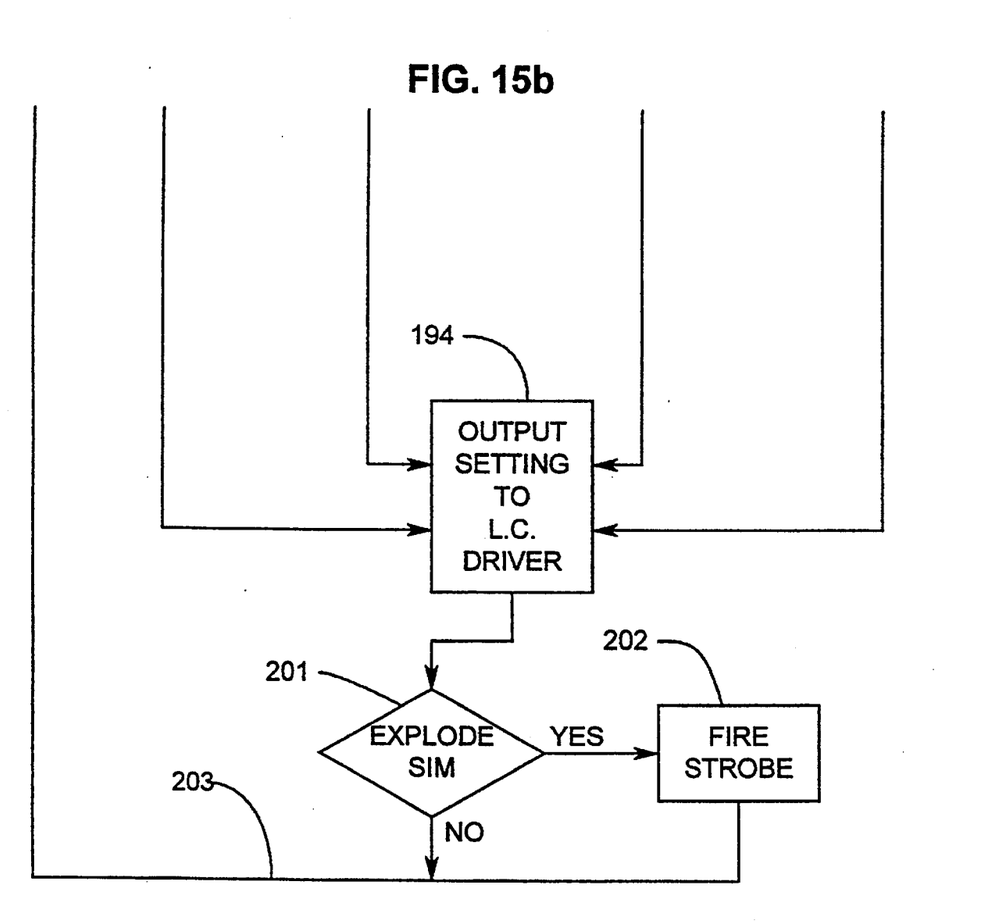

Control panel 3 further includes the following:

An operation mode switch 6 (e.g., a rotary switch) for selecting either manual operation (AUTO-SIM OFF) or preprogrammed operation (AUTO-SIM ON) which accesses, from electronic memory storage devices, a predetermined syllabus of settings; FIG. 15 shows an example flowchart of a switch-sampling and memory-access program which might drive the microprocessors (FIGS. 10, 11) of the transmitter/controller 1 (FIG. 1) and/or the receiver/ controller 25 (FIG. 2);

A vision acuity switch 7 (e.g., a rotary switch) which allows selection of one of various levels of vision occlusion (e.g. Levels 1–5). The visual acuity settings range from total smoke engulfment to some predetermined unit of higher visibility;

A smoke pattern switch 8 (e.g., a rotary switch) for selecting possible smoke simulation conditions and patterns (e.g. normal, random or swirling). With switch 8 in the normal position, a pre-set value taken from vision acuity switch 7 is used. In the random position, simulated smoke varies arbitrarily in its visually occlusive effect. In the swirling position, simulated smoke takes on a rolling character across LC lens 21 (and thus across transmitter lens 11). Pre-programmed settings are drawn from a preset syllabus stored in memory;

An explosion simulation switch 9 (e.g., a pushbutton switch) which allows the instructor to intermittently trigger bright flashes of light from at least one strobe lamp 22 located central to the trainee's vision in the housing 24 of view-limiting simulation device 20;

A clear switch 10 (e.g., a pushbutton switch) for clearing LC lens 21 (and thus transmitter lens 11) and immediately removing occlusions to the trainee's vision. Clear switch 10 also activates an audio alarm 23 located in the housing 24 of view-limiting simulation device 20;

An LC display 12 which provides a readout of the visual acuity setting (level 1–5) and the transmitter operating mode (manual or automatic).

Referring again to FIG. 2, view-limiting simulation device 20 is shown in the form of a trainee's respirator mask (with attachments in fathom). The respirator mask housing 24 encompasses the following: a receiver/controller 25 which includes an FM radio receiver/decoder/driver unit; a battery compartment 33 with a battery 34, and a battery backup 35; a locking ON/OFF power switch 27; a clear switch 28; an FM antenna 29; at least one flash strobe lamp 22; a photometric platform 30; an audio shutdown alarm 23; and a multi-layered LC lens 21. Simulation device 20 might include a full set of manual switch settings as found on transmitter 1 (FIG. 1).

The power switch 27 controls all power to the simulator mask 20. Battery compartment 33, battery 34 and battery backup 35 provide power for the mask 20. LED indicator 36 remains constantly lit upon full charge of batteries 34, 35 and stays lit as long as a sufficient level of charge remains in the batteries. Upon detecting a certain level of battery discharge, LED indicator 36 flashes so that the trainee and trainer can see that batteries 34, 35 need recharging. A total power failure causes alarm 23, which might be a piezo-electric tone generator, to generate an intermittent tone so that the trainee will know that a power failure has occurred and the mask 20 should be removed.

Mask 20 also includes its own clear switch 28 which is used for clearing LC lens 21 in the event of an emergency. Activation of the clear switch 28 energizes alarm 23 to generate a solid tone so that the instructor and/or the trainee will know that a clear has been initiated. The transmitter and simulation mask audio warning devices normally operate independently of each other. Accordingly, the instructor and the trainee can receive independent or simultaneous warning signals.

Other audio signals might be generated by at least one audio speaker (not shown) located at a point near the ears of the wearer on the simulation device, and driver circuitry (not shown) to simulate sounds encountered in firefighting situations (e.g. fire, wind, burning and stressed structures, explosions, and spraying water).

FM antenna 29 is mounted inside mask housing 24 so as to be unobstructive. Antenna 29 receives FM signals from transmitter 1 and sends these Signals to receiver/controller 25. Receiver/controller 25 receives the FM radio signals, decodes the signals content, and formats the resulting information to drive LC lens 21 of mask 20.

Figure 10:
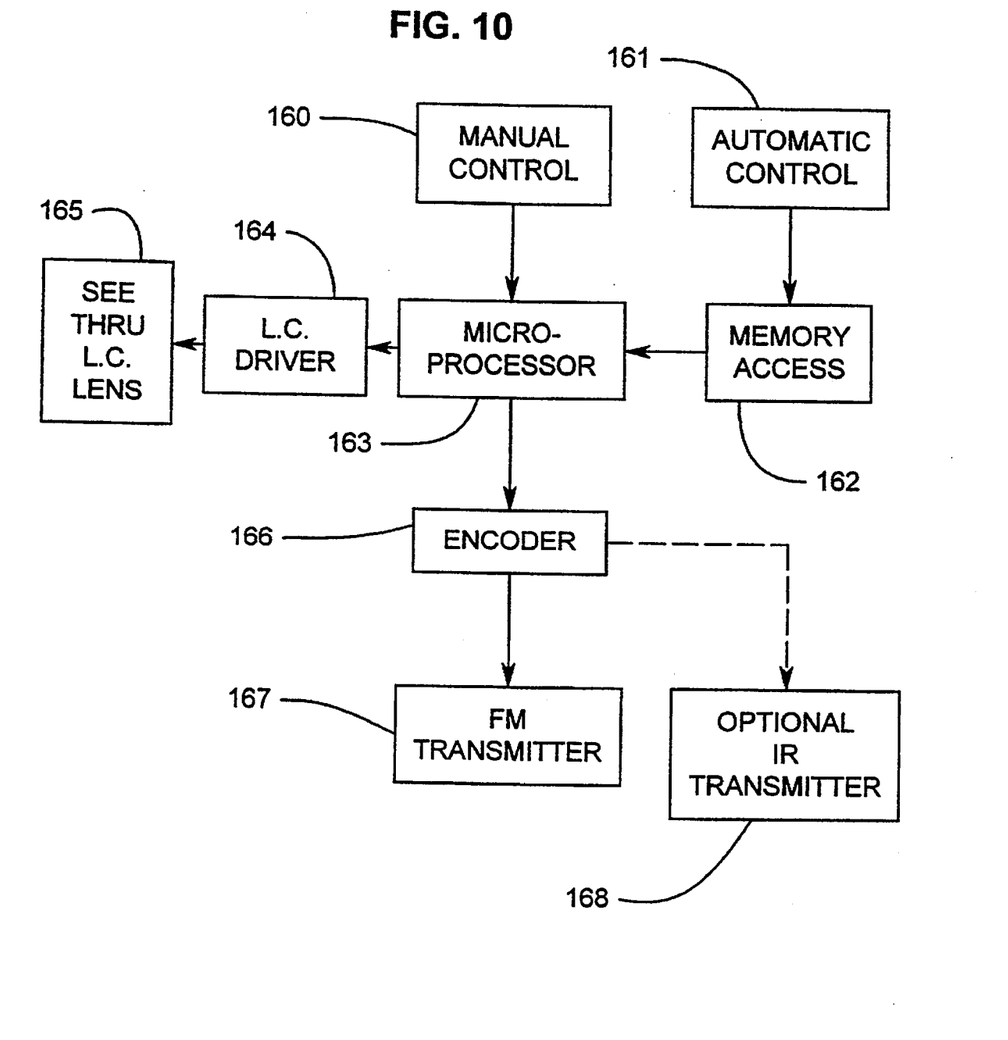
FIG. 10 is a system/block diagram showing electrical data paths for the transmitter/controller.

Referring to FIG. 10 a representative system/block diagram shows the electrical flow for the transmitter 1 (FIG. 1). The control panel switch settings (as described above) select manual control 160 and/or automatic control 161. Automatic control depends on pre-programmed patterns being accessed from electronic memory storage devices 162 (e.g., computer disk, RAM, ROM, CD). A microprocessor 163 processes such control information into driver signals for LC driver 164 and See-through LC lens 165. Microprocessor 163 also sends such control information to an encoder 166, which in turn sends to encoded signals to an FM transmitter 167, or an optional IR transmitter 168.

Figure 11:
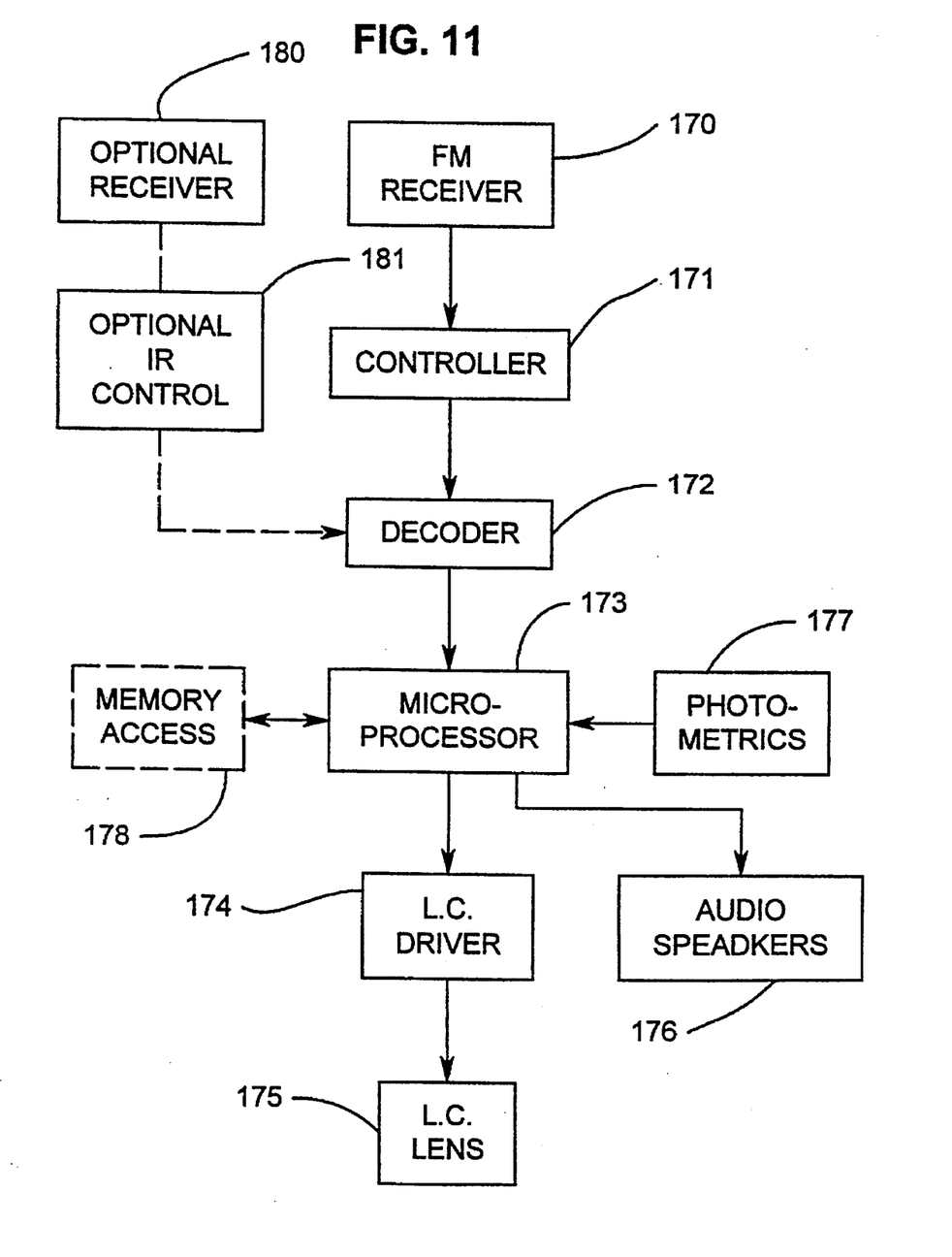
FIG. 11 is a system/block diagram showing electrical data paths for the receiver/controller.

In FIG. 11, a representative system/block diagram shows the electrical flow for the receiver/controller 25 (FIG. 2). As indicated, the signals can be transmitted and received through several mediums, for example, FM or IR. An FM receiver 170 (or IR receiver 180) sends signals to a controller 171 (or IR controller 181). The controller 171 (181) uses a decoder 172 which feeds the decoded signals into a microprocessor 173. Automatic control selections may access pre-programmed pattern sequences stored in electronic memory devices (e.g., computer disk, RAM, ROM, CD). Microprocessor 173 sends control signals to LC driver which in turn drives LC lens 175. Microprocessor 173 might also produce control signals to drive audio speakers 176. Alternatively, photometric sensor signals 177 might feed control pattern signals into microprocessor 173 to then drive LC driver 174 and LC lens 175.

Referring to FIG. 15, an example flowchart of a switch-sampling and memory-access program is shown. This program might drive the microprocessors 163 and/or 173 (FIGS. 10, 11). The program checks the auto-simulation switch 185; if it is on, the auto-simulation settings are accessed from memory 186 and counters are incremented 187 and settings are output to LC driver 194; else the auto-simulation setting is off and battery failure 188 is tested. If the battery has failed, an alarm is sounded 189 and the program ends 204; else the clear switch 190 is tested. If the clear switch is activated, an alarm is sounded 191 and the program ends 204; else the normal mode of operation 192 is tested. If in normal mode, a vision acuity setting is accessed 193 and output to the LC driver 194. If not in normal mode, then random mode 195 is checked. If in random model then random settings are accessed 198 and counters incremented 200 and settings output to LC driver 194; else swirl mode is checked. If in swirl mode, then swirl settings are accessed 197 and counters incremented 199 and settings output to LC driver 194. The explosion simulation switch 201 is then tested. If activated, then a strobe is fired 202; else no strobe is fired. The program then loops back to resample the appropriate switches and output driver settings.

For automatic control selections, pre-programmed pattern sequences are accessed from electronic memory. Referring again to FIGS. 1 and 2, such automatic control can be achieved by storing such control sequences in electronic memory storage devices 162 (FIG. 10) located in transmitter 1 (FIG. 1). The transmitter/controller would then access appropriate control sequences to drive the LC lens segments and continually transmit this control information to receiver/controller 25 (FIG. 2). Such control uses an uninterrupted transmission link between the transmitter 1 and simulation device 20 to progress through the electronically stored pattern sequences.

Alternatively, pre-programmed control sequences might reside in electronic memory storage devices 178 (FIG. 11—shown in fathom) located in receiver/controller 25. Automatic control selections might then require transmitter 1 to transmit much shorter electronic commands which would direct receiver/controller 25 to access and progress through the electronically stored pattern sequences without further instructions. In this alternative embodiment, since memory devices 178 are local to receiver/controller 25, the automatic sequences might progress without a continuous transmission link between transmitter 1 and simulation device 20.

In the preferred embodiment, it is desired to maintain a constant transmission link between transmitter i and receiver/controller 25. This is so that constant control can be exercised over the trainee's visual abilities. Training environments are often dangerous and/or located in high and unprotected places (e.g., fire towers and buildings with open windows and ledges). It is important for the trainer to constantly know what the trainee is seeing so that the trainer can keep the trainee out of danger. As a result, another feature includes circuitry in simulation device housing 24 to clear the LC lens 21 of simulation device 20 and to generate an audible signal if the trainee wanders outside of transmitter range and loses transmission signal lock.

Figure 7:
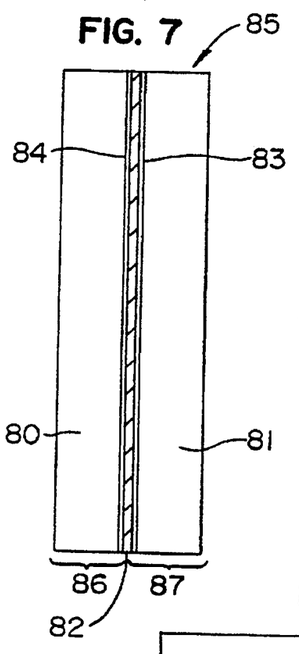
FIG. 7 is a single-layered liquid crystal (LC) lens construction.

Referring to FIG. 7, a typical single layer LC lens construction 85 is shown with substrates 80 and 81 (typically made from plastic) sandwiching the voltage controlled LC material 82. LC lens 85 includes a front plane 86 and a back plane 87. Substrate 80 and conductive layer 84 line the front plane of LC material 82. Substrate 81 and conductive layer 83 line the back plane of LC material 82. Conductive layers 83, 84 allow voltage to be applied to LC material 82. The opacity of LC material 82 can be controlled by varying the voltage applied to conductive layers 83, 84. Example varieties of LC material 82 include twisted nematic, supertwist, and active matrix. Polarizers may line the outer surfaces of substrates 80, 81 to control the contrast and transmission of light.

Conductive layers 83, 84 may be etched to create different segments which are electrically isolated from each other. Electrical connections (not shown) can lead to each segment and can be used to apply voltage to that segment of LC material 82. The front and back plane conductive layers 83, 84 might be identically (or similarly) etched to created individually controllable segments. Similarly, controllable segments might also be created by etching only one conductive plane for each LC layer. The preferred embodiment etches only one conductive plane, thus leaving the other conductive plane unetched.

The preferred embodiment also uses dynamic scattering LC layers with plastic substrates. The plastic substrates prove to be flexible (even in multi-layered configurations) and are more easily mounted in simulation devices which might require bending of the mounted LC lens construction. A polycarbonite film is optically laminated on each side of the plastic substrates to give added-rigidity and to protect the substrate surfaces. This film ranges in thickness from 5 to 30 thousandths of an inch. The preferred embodiment also utilizes LC configurations which default to a completely opaque condition when no voltage is applied (i.e., a negative image LC).

In FIG. 7, LC material 82 may be undyed and appear completely white when no voltage is applied. Alternatively, a guest-host dichroic can be used which consists of an LC material with a "host" fluid containing a color dyed "guest." In the single-layered configuration, smoke conditions can be realistically simulated with either undyed-white or gray-dyed LC materials.

Figure 8:
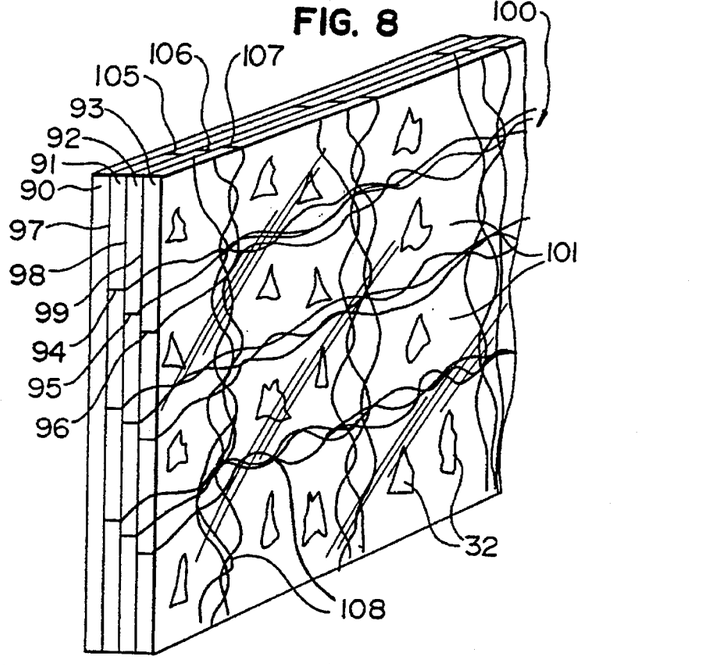
FIG. 8 is a cross-sectional view of a complex multi-layered and multi-color liquid crystal (LC) lens construction.

Referring to FIG. 8, a multi-layered LC lens construction 100 is shown with various host dyes included between the substrate layers 90, 91, 92, 93 to facilitate producing colors. This multi-layered LC construction is utilized in the preferred embodiment and is comprised of stacked single layered constructions (as per FIG. 7). If, however, only smoke conditions are to be simulated, a simulation device 20 (FIG. 2) might use only a single-layered LC lens (as per FIG. 7), constructed with individually controllable non-linear segments—as described below, but for only one layer. This single layer construction is equally applicable to the smoke simulation examples also described below.

LC lens 100 (and LC lens 21 in FIG. 2) is divided, across its working area, into various areas or segments 101 (segments 31 in FIG. 2) to facilitate simulating a wide range of manual and auto-controlled operating conditions. A yellow host dye is mixed with LC material 97 located between substrates 90 and 91. A red host dye is mixed with LC material 98 located between substrates 91 and 92. Either no host dye (white LC) or a gray host dye is mixed with LC material 99 located between substrates 92 and 93.

Line 94 represents a wavering (e.g., non-linear, curve-shaped) line etched horizontally across the conductive layer which drives yellow LC material 97. Such wavering lines might be irregularly curved and/or irregular in displacement (from the line's center axis), or regularly curved and/or regular in displacement; Alternatively this line might be a combination of all such characteristics. Line displacement typically varies to within one inch or less from the line's center axis. Such line displacement will be constrained by the relative size and number of controllable segments across the working area of the lens. Smaller, tighter segmentation will allow for less displacement from a given line's center axis. Larger segmentation will allow for more displacement.

Line 95 represents a similar wavering line etched horizontally across the conductive layer which drives red LC material 98. Line 96 represents a similar wavering line etched horizontally across the conductive layer which drives undyed-white (or dyed-gray) LC material 99. These horizontal lines are etched at different substrate levels. In this embodiment, the lines appear to cross when the LC layers are stacked and viewed from the front of LC lens, due to their sufficient displacement and irregularly curved-shape.

Similarly, line 105 represents a wavering line etched vertically across the conductive layer which drives yellow LC material 97. Line 106 represents a wavering line etched vertically across the conductive layer which drives red LC material 98. Line 107 represents a wavering line etched vertically across the conductive layer which drives undyed-white (or dyed-gray) LC material 99. These vertical lines are etched at different substrate levels, but appear to cross, due to their wavering nature, when the substrate levels are stacked and viewed from the front of LC lens. In practice, however, lines 94–96 and 105–107, and the resulting segment 101 separations, are beyond the focal length of the trainee; They cannot be seen and present no distractions.

Referring again to FIGS. 2 and 8, the red, yellow and undyed-white (or dyed-gray) conductive layers also have flame shape segments 32 etched into the conductive layers which drive the LC materials. These flame segments 32 are uniformly dispersed and aligned across the red, yellow, and undyed-white (or dyed-gray) LC layers. Alternatively, as with the wavering segments above, each flame segment. 32 is purposefully misaligned with the underlying color layer's flame segment. Each flame segment 32 is individually controllable so as to create a moving or flickering flame to the viewer. The flame shapes 32 are relatively more noticeable to the trainee, due to their physical size, than the wavering lines 94–96 and 105–107.

As combined, these horizontal and vertical lines create a grid of individual wavering segments 101, and flame shape segments 32, in each color layer 97, 98, 99 which can be individually addressed and controlled through multiplexing control of the individual wavering and flame shape segments. As each color layer is stacked upon each other, the wavering segments and flame shapes segments overlap, in a general way, and form a matrix extending across the working area and depth (layering) of the LC lens 100.

By controlling this matrix of segments and/or flame shapes, the trainee's vision can be occluded by activating any color, or a combination of colors, in any segment, at any level of opacity, for any period of time. The wavering overlap 108 of lines 94–96, 105–107 and aligned overlap of flame segments 32, allows for more realistic simulations of fire and smoke patterns, particularly as adjoining segments are sequentially activated and deactivated across LC lens 100.

Figure 12:
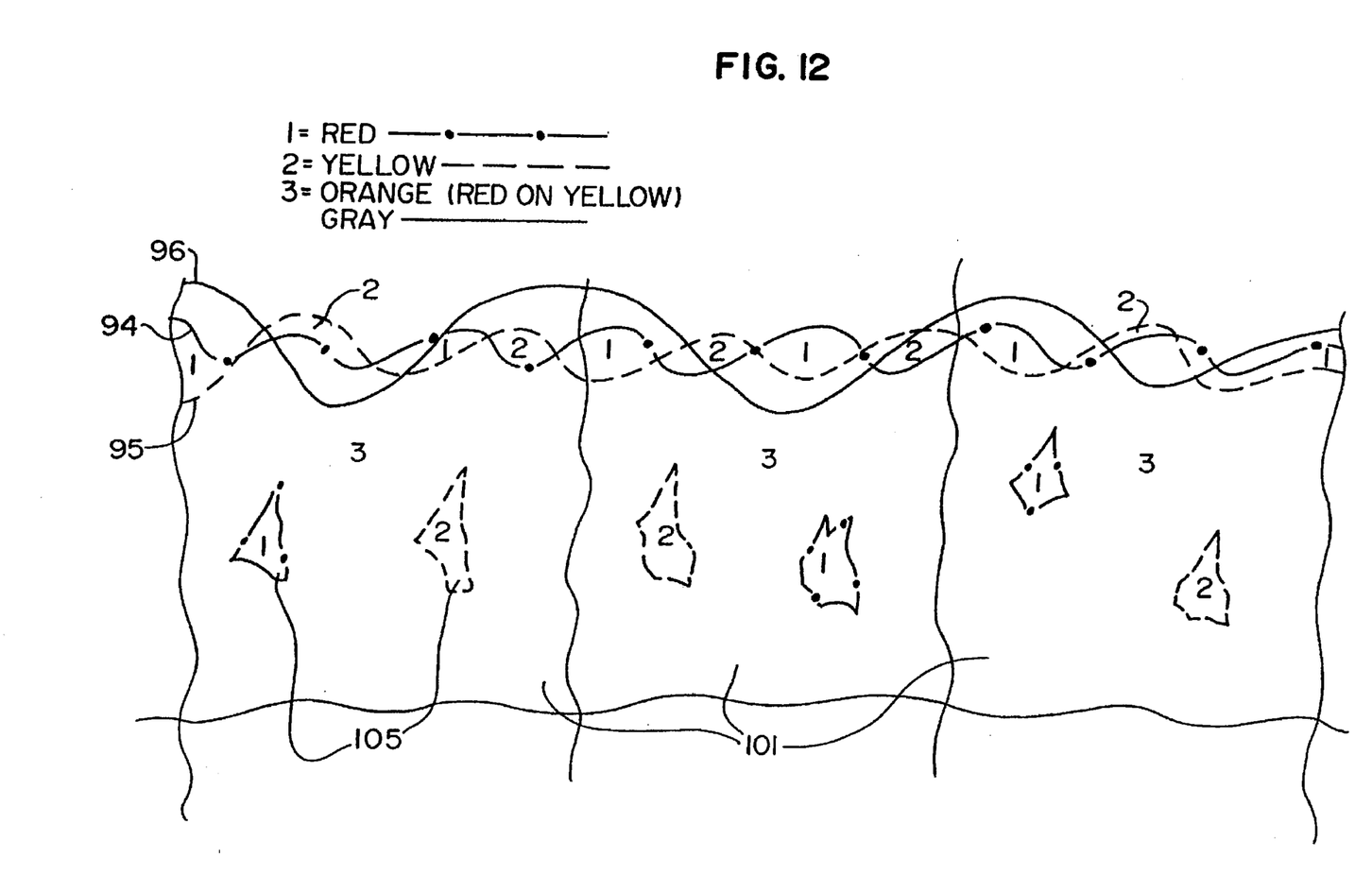
FIG. 12 shows three adjoining segments, representative from the LC lens of the view-limiting simulation device of FIGS. 2 and 8, with the red and yellow LC layers activated.

Referring again to FIGS. 8 and 12, a variety of conditions may be simulated which are typically encountered by a firefighter. FIG. 12 shows three adjacent LC lens segments 101 with both red and yellow overlapping/wavering segments activated, and with the undyed-white (or dyed-gray) segments not activated. As shown, where the red and yellow segments overlap and both are active, the trainee sees an orange color (orange areas color coded as "3"). Where the red segmenting line 94 wavers and extends beyond the yellow segmenting line 95, the trainee sees red (red areas color coded as "1"). Alternatively, where the yellow segmenting line 95 wavers and extends beyond the yellow segmenting line 94, the trainee sees yellow (yellow areas color coded as "2"). This is assuming that the adjoining segments above segments 101 (not shown in detail) are non-active—otherwise, different color combinations might result.

Referring to FIG. 12, the individually controllable flame segments 105 have been independently activated (as indicated) to be either red or yellow. This example is representative only. Flame segments 105 might appear oppositely colored or appear orange colored if both red and yellow LC layers are activated as with the surrounding wavering segments 101.

Accordingly, adjoining and/or overlapping red and yellow dyed wavering segments 101 can be activated on an alternating basis to simulate, for example, "licking flames" across the wavering segment lines. Similarly, flame segments 105 can be activated, either together or on an alternating basis, to add to the "licking flame" simulation. Given the generally random nature of a "licking flame," this simulation could take on many forms, with the above description being a representative example.

Figure 13A:
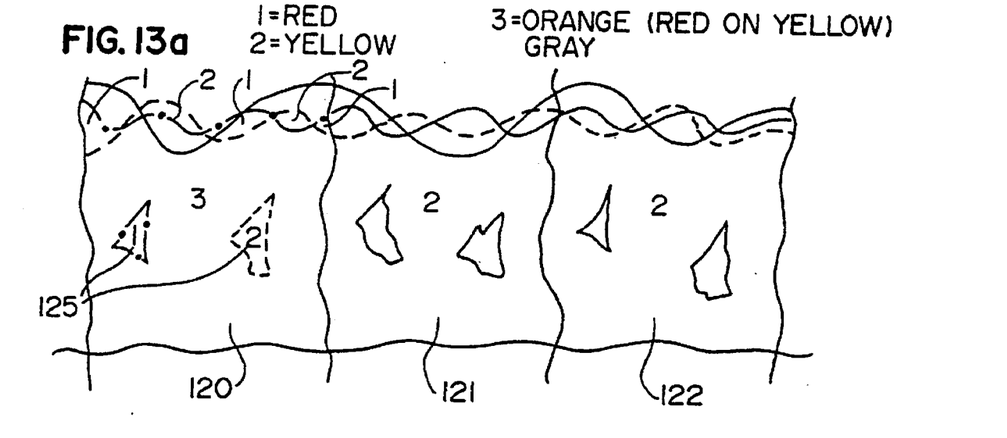
FIG. 13 shows three adjoining segments, representative from the LC lens of the view-limiting simulation device of FIGS. 2 and 8, at three different points in time (a, b, and c) showing a simulation of "rolling" fire.
Figure 13B:
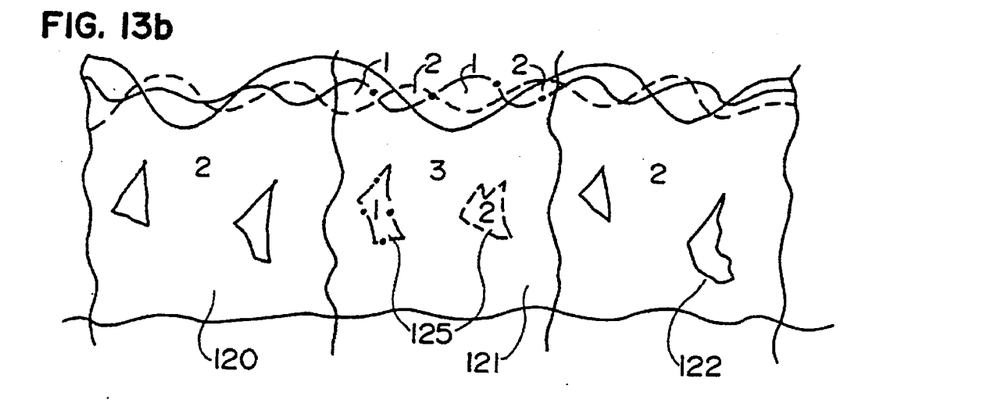
Figure 13C:
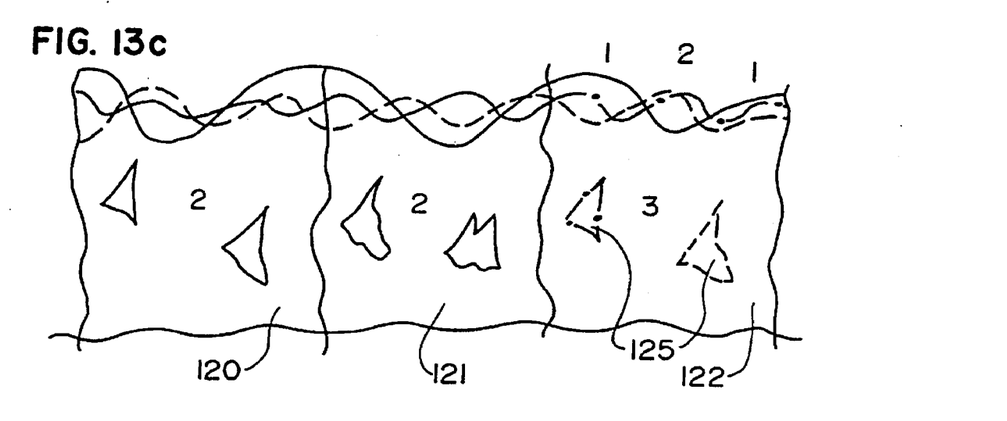

A "rolling flame" might be simulated, for example, as follows: In FIGS. 13(a)–13(c), three adjoining segments 120, 121, 122 are shown at three different points in time. The first point in time is illustrated in FIG. 13(a) which shows the first adjoining segment 120 having both its red and yellow overlapping wavering layers activated, causing the trainee to see red, yellow, and orange as described above for FIG. 12. For added effect, the individually controllable flame segments 125 have been activated in red and yellow as shown in the first segment 120. The second and third adjoining segments 121, 122 have only their yellow wavering layers activated.

The second point in time is illustrated in FIG. 13(b) which shows the second adjoining segment 121 having both red and yellow wavering layers active. Additionally, flame segments 125 have been activated in red and yellow as shown. Only the yellow wavering layer is active in the first and third adjoining segments 120, 121.

At the third point in time, FIG. 13(c) shows the third adjoining segment 122 having both red and yellow wavering layers active. Additionally, flame segments with reference numerals 125 have been activated in red and yellow as shown. Only the yellow wavering layer is active in the first and second adjoining segments 120, 121.

As the red layer in each adjoining segment 120–122 is progressively activated and then deactivated, the colors associated with a flame (at close proximity) appear to "roll" across and appropriately occlude the trainee's field of vision. The shifting activation of flame segments 125 adds to this effect. The wavering vertical segmentation (not detailed in FIG. 13) will also add realism to the simulation, as per the related description of colors associated with the horizontal wavering lines of FIG. 12—but as applied to the vertical lines.

Referring again to FIG. 8, undyed white (or dyed-gray) LC layer 96 and corresponding undyed-white (or dyed-gray)

segments 108 can be opaqued to simulate various levels of smoke density and resulting trainee vision occlusion. For total blackout effects, segments 101 can be collectively opaqued across the whole LC lens 100.

Figure 14A:
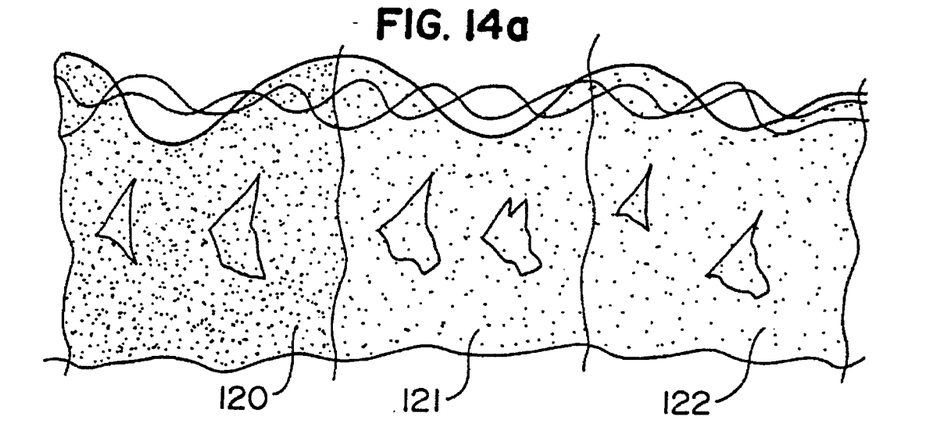
FIG. 14 shows three adjoining segments, representative from the LC lens of the view-limiting simulation device of FIGS. 2 and 8, at three different points in time (a, b, and c) showing a simulation of "rolling" smoke.
Figure 14B:
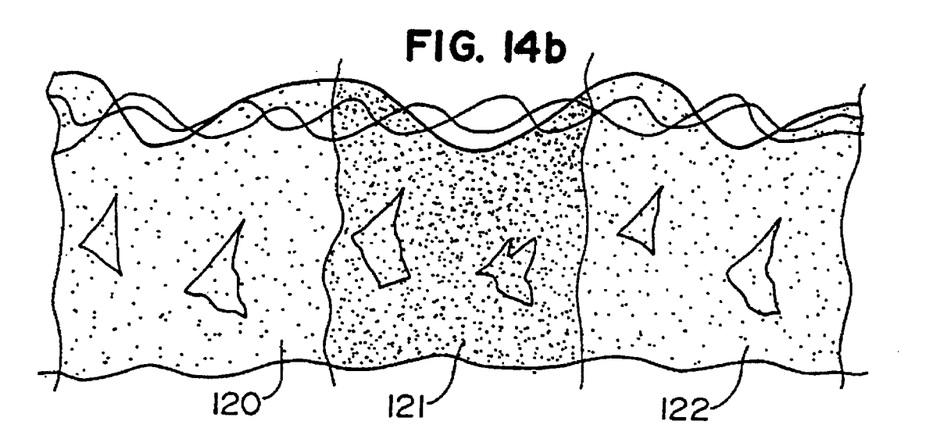
Figure 14C:
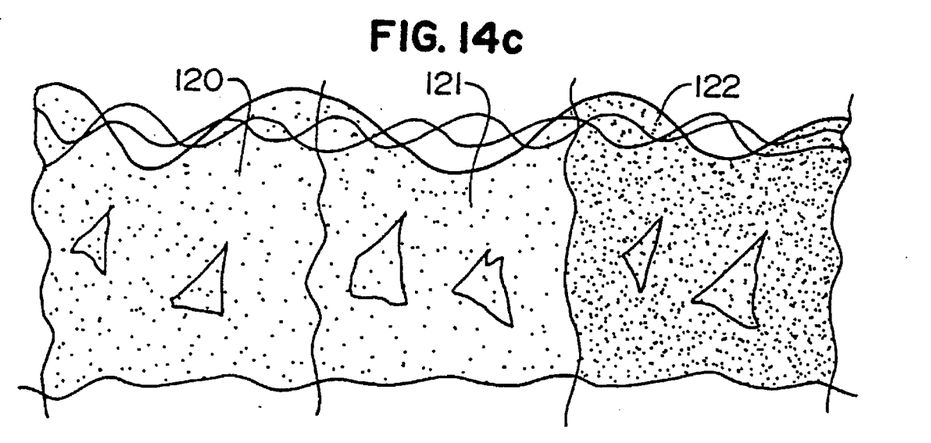

Alternatively or collectively, "rolling" smoke conditions might, for example, be simulated as follows: In FIG. 14(a)–(c), three adjoining segments 120, 121, 122 are shown at three different points in time (as in FIG. 13). At the first point in time, FIG. 14(a) shows the first adjoining segment 120 with its undyed-white (or dyed-gray) LC layer opaqued significantly, while adjoining segments 121, 122 are more translucent. At the second point in time, FIG. 14(b) shows the second adjoining segment 121 opaqued significantly, with adjoining segments 120, 122 being more translucent. At the third point in time, FIG. 14(c) shows the third adjoining segment 122 opaqued significantly, with adjoining segments 120, 121 being more translucent. As this example demonstrates, by sequentially varying the opacity of adjoining undyed-white (or dyed-gray) LC segments 120–122, a "rolling" smoke across the trainee's vision is effectively simulated.

Alternatively, a "swirling" smoke could be simulated by varying the opacity of undyed-white (or dyed-gray) LC layer segments 101 (FIG. 8) in a generally circular, or spiraling, pattern. Higher degrees of realism could be achieved through more precise and graduated control of opacity levels in adjoining segments. This would more realistically simulate densifying smoke across the trainee's field of view. Similarly, faster and tighter progressions of smoke patterns across segments 101 of LC lens 100 would more realistically simulate the visual occlusion experienced in dynamically changing smoke-filled conditions.

While the fire and smoke simulation examples have been described separately for explanation purposes, such fire and smoke simulations are intended to function either alone, or in combination with one another. Smoke simulations involve opaquing undyed-white (or dyed-gray) LC layer 96, which is separate from LC red and yellow layers 94, 95 used for fire simulations. In the most complete simulation, all color layers—white (or gray), red, and yellow—would operate simultaneously to simulate the full effect of being exposed to fire and smoke at the same time.

Furthermore, the aforementioned patterns rely on a sequential progression as to which adjoining segments and/or LC color layers will be activated next. As mentioned above, these sequential patterns are accessed from a preprogrammed syllabus which is stored in electronic memory. This electronic memory might reside in either the transmitter 1 (FIG. 1) or the simulation device 20 (FIG. 2), or both. Random smoke patterns progress according to electronically generated random sequences.

Figure 16:
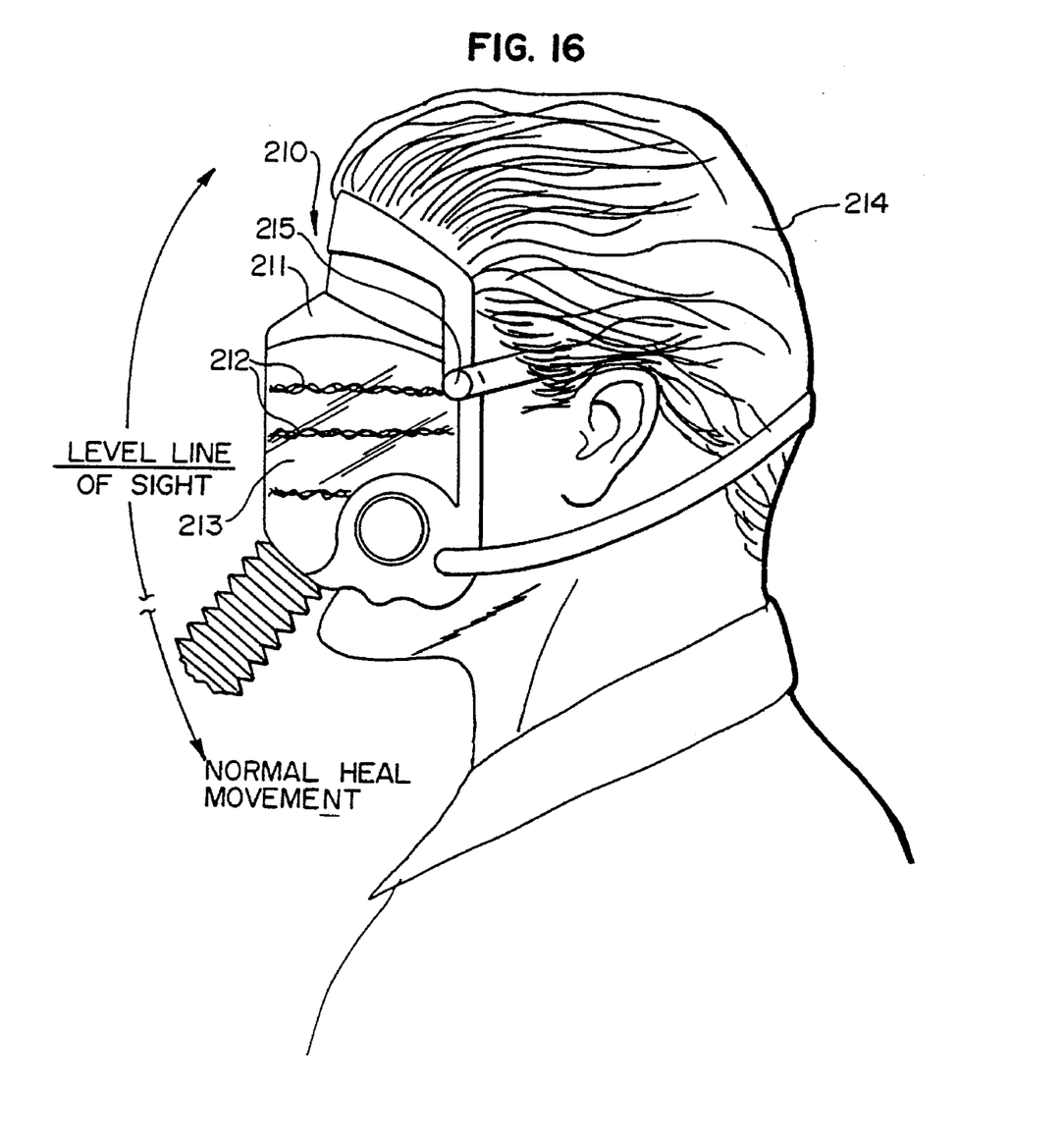
FIG. 16 shows a trainee wearing a simulation device which additionally senses relative head movements and shifts the simulation which then appears to remain in a constant relative location as the trainee moves his head.

Referring to FIG. 16, another feature of the present invention is demonstrated which will simulate the proximate location of an obstruction such as a fire. In any simulation, the LC lens 203 is mounted to the trainee's head 204 as part of the simulation device 200. In an uncorrected simulation, if a fire is simulated across lens 203 in the trainee's line of sight, the fire will "move" with the trainee's line of sight as the trainee moves his head up and down.

Such a result is unrealistic and can be corrected by including an attitude sensor 205 (e.g., an electrolytic tilt sensor), in the simulation device 200 which detects the relative elevation motion (up and down) of the trainee's head movements. This relative motion can then be used to shift the present simulation up or down the appropriate segments of LC lens 203 so that the simulation appears to remain in relatively the same "external" location.

For instance, if a fire is simulated directly in front of the trainee's leveled head, the simulated fire will be properly shifted downwards on LC lens 203 if the trainee raises his head; Similarly, the fire will be shifted upwards if the trainee lowers his head. This relative shifting up and down on the different levels of horizontally wavering lines 202 and horizontally adjoining segments simulates the appearance of a constant relative "external" location of the fire.

A left-and-right (axial) motion sensor could also provide inputs to relatively shift the simulation across the vertical lines and vertical adjoining segments of LC lens 203, as per the trainee's head movements, to additionally simulate a constant relative location of a fire.

Alternatively or collectively with the example simulations described above, the appearance (e.g. darkness, contrast, opacity) of the red and yellow colors in each of the wavering segments 101 (FIGS. 8 and 12), and the flame-shaped segments 105 (FIG. 12), can be controlled by varying the voltage to each segment and/or the darkness of the underlying undyed white (or dyed-gray) LC segments. As mentioned above, each multilayered wavering segment 101 has an individually controllable undyed-white (or dyed-gray) LC layer in the stack. Similarly, each flame-shaped segment 105 in the yellow and red LC layers aligns with an individually controllable flame-shaped segment in the undyed-white (or dyed-gray) LC layer. This allows for individual and/or collective control over the appearance of the wavering segments 101 and flame segments 105. For example, "deeper" colored fires (e.g. reds and yellows) might be simulated by appropriately opaquing the undyed-white (or dyed-gray) LC layer for any given wavering segment 101 and/or flame segment 105.

Alternatively or collectively with the example simulations described above, the visual effects of blackouts—due, for instance, to depleted oxygen levels—might also be simulated. For example, adjoining and/or overlapping white (or gray), red, and yellow segments can be collectively activated in their primary colors to simulate the blackout effects of training under depleted oxygen levels. The opacity and intensity of the colors might be increased across the LC lens 21 (FIG. 2) until total blackout conditions are achieved.

Figure 9:
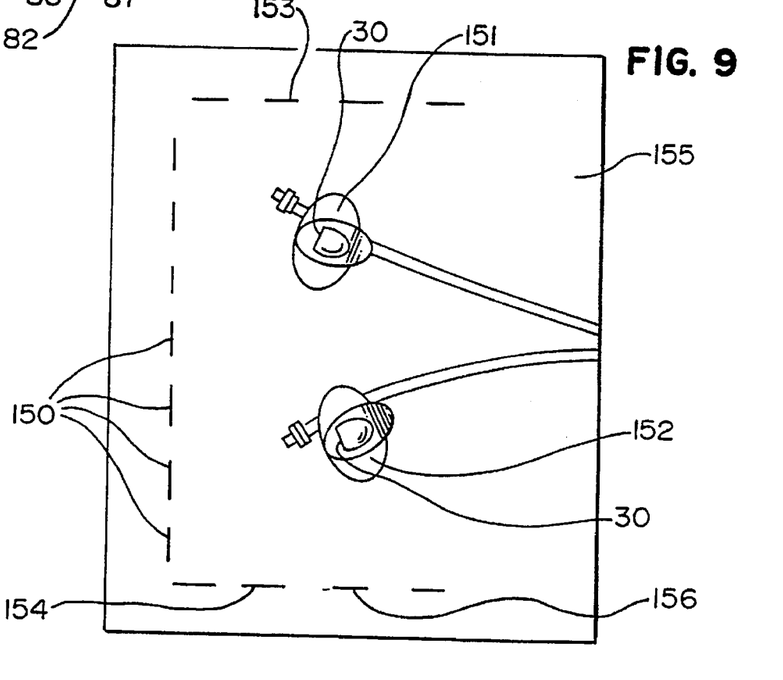
FIG. 9 is top view of a training room which contains multiple light pattern sources which transmit light pattern signals to the trainee's photometric sensors.

An alternative means for controlling the view-limiting simulation device-includes light pattern transmissions (either visual or IR). Referring to FIG. 2 and FIG. 9, mask housing 24 additionally includes a photometric sensor housing and platform 30 which senses light pattern from various sources 150. LC receiver/controller 25 can alternatively process such patterned light signals to subsequently drive LC lens 21 and simulate various firefighting conditions (e.g. smoke, flames, blackouts) as described above.

Photometric sensor housing and platform 30 (FIG. 2) is controlled by controller circuitry and a microprocessor which evaluates pulsed light from sources 150 (FIG. 9). Depending on the visual simulation desired, the instructor will switch on the appropriate light pattern frequencies for various locations in the training room.

Each independent light source 150 can generate independent frequencies of flashing light. When the trainees 151, 152 look in any given direction, the individual pattern frequencies of each lamp 150 will be transmitted to control the vision of the trainee by way of the photometric platform 30, and the corresponding controller circuitry and microprocessor.

In other words, the visual simulation will change as the trainee moves his head in various directions in a controlled area 155 (FIG. 9). This is achieved by using photometric sensors and associated control circuitry which will directionally isolate and detect individual frequency patterns from lamps 150. Individual lamps 150 might also send directional signals which will minimize interference between adjoining (and other) lamps.

For example, the frequency pattern generated by pulsed light source 153 might cause the LC driver circuitry to simulate rolling smoke with an underlying low intensity yellow fire. Pulsed light source 154 might cause the LC driver circuitry to simulate wildly fluctuating and intensely licking flames, with little or no smoke. Adjoining pulsed light source 156 might cause the LC driver circuitry to simulate licking flames at a slightly lesser intensity. Such realistic differences in proximate conditions, with no crossover interference between the lamps, could help teach the trainee to discern between dangerous and life threatening situations on opposite sides of a training room. The preferred type of lamp 150 would be infrared LED'S so as not to confuse the trainee with visible flashing lights.

Accordingly, the trainee might train in one of two environments. The first environment would be any training facility as it is currently configured, without additional installation of light sources 150. This might include buildings, houses, aircraft, vehicles, forests, ships, factories and/or oil drilling operations. The trainee's vision would be limited by the white (or gray), red, and/or yellows segments of LC lens 21 (FIG. 2) according to the switch settings on the FM radio transmitter 1 (FIG. 1).

A second environment might be customized, with the installation of multiple light sources 150, to simulate conditions as dependant upon the trainee's position and orientation in the environment. Such positioning of light sources 150 could easily coincide with actual physical barriers to provide a more realistic fire fighting simulation.

Referring again to FIG. 1, the transmitter 1 might also include control switches (not shown) in the lower panel 13 for a fire projection system (not shown). This projection system would also utilize transmitter 1 to transmit coded signals, as configured by the instructor, to receivers/drivers mounted inside separate fire projection devices (not shown). These fire projection devices would utilize multi-layered and multi-colored LC lenses for simulating fire patterns, and an accompanying projection devices for projecting the simulated fires onto walls, screens, and other objects.

In combination, the view-limiting simulation device 20 (FIG. 2), along with the fire projection system (not shown), creates a controllable, safe, and realistic training environment for firefighter trainees.

Figure 3:
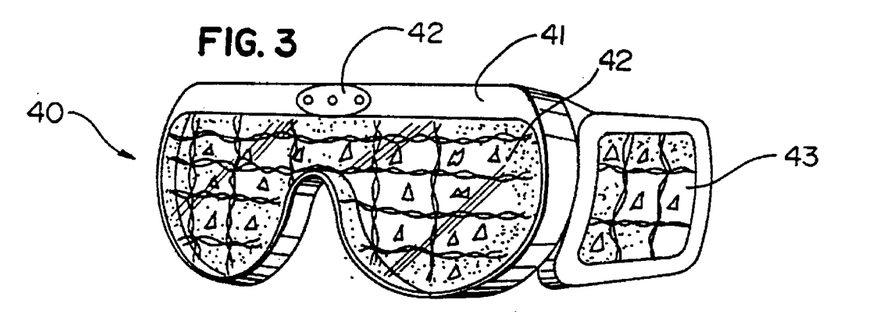
FIG. 3 is a glasses-style view-limiting simulation device.

Referring to FIG. 3, an alternative embodiment is shown which uses a glasses-style view-limiting simulation device 40. Device 40 similarly includes the following (some not shown) in device housing 41: a receiver/controller, an antenna, a locking ON/OFF switch, a clear switch, an audible alarm, at least one strobe, a battery compartment, a battery and a battery backup, a photometric sensor platform 42, and at least one multi-layered LC lens 42. This style of simulator might also include side-mounted LC lenses 43 as viewed peripherally by the trainee.

Figure 4:
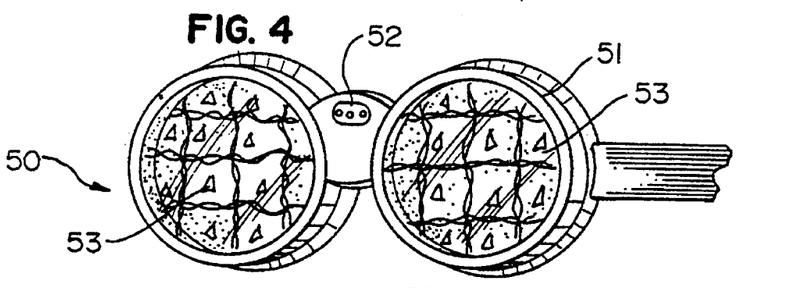
FIG. 4 is a goggles-style view-limiting simulation device that could be used inside a conventional respirator.

Referring to FIG. 4, another alternative embodiment is shown which uses a goggle-style view-limiting simulation device 50. Device 50 similarly includes the following (some not shown) in device housing 51: a receiver/controller, an antenna, a locking ON/OFF switch, a clear switch, an audible alarm, at least one strobe, a battery compartment, a battery, and a battery backup, a photometric sensor platform 52, and a pair of multi-layered LC lenses 53. This style of simulator incorporates separate lens elements 53 over each eye.

Figure 5:
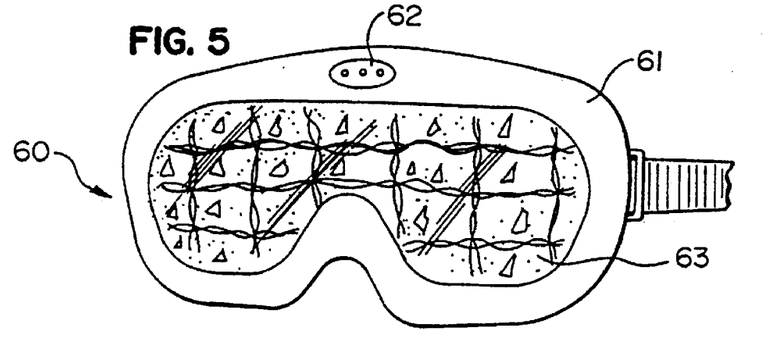
FIG. 5 is a child-sized view-limiting simulation device for training in school environments.

Referring to FIG. 5, another alternative embodiment is shown which uses a smaller sized mask-type view-limiting simulation device 60 for use as a child trainer. Device 60 similarly includes the following (some not shown) in device housing 61: a receiver/controller, an antenna, a locking ON/OFF switch, a clear switch, an audible alarm, at least one strobe, a battery compartment, a battery, and a battery backup, a photometric sensor platform 62, and a multi-layered LC lens 63.

Figure 6:
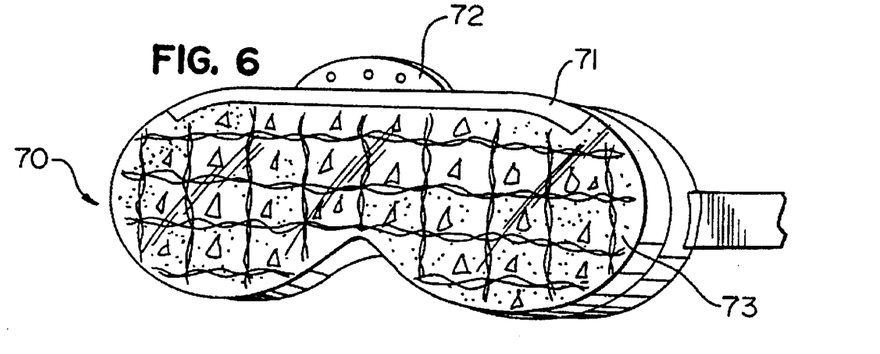
FIG. 6 is a military-style view-limiting simulation device that could also be used by forest firefighters without a respirator.

Referring to FIG. 6, another alternative embodiment is shown which uses a military-style view-limiting simulation device 70. Device 70 similarly includes the following (some not shown) in device housing 71: a receiver/controller, an antenna, a locking ON/OFF switch, a clear switch, an audible alarm, at least one strobe, a battery compartment, a battery, and a battery backup, a photometric sensor platform 72, and a multi-layered LC lens 73. This style of simulator, for example, might also be used by forest firefighters without a respirator.

While only two preferred embodiments of the invention have been described hereinabove, those of ordinary skill in the art will recognize that either embodiment may be modified and altered without departing from the central spirit and scope of the invention. Thus, the preferred embodiments described hereinabove are to be considered in all respects as illustrative and not restrictive, the scope of the invention being indicated by the appended claims, rather than by the foregoing description, and all changes which come within the meaning and range of equivalency of the claims are intended to be embraced herein.

What is claimed is:

1. A firefighter training device for occluding a trainee's vision and simulating field conditions across the trainee's field of view, said device comprising:

a mask adapted to be worn by the trainee, said mask having a housing;

multi-layered, voltage controlled liquid crystal (LC) lens mounted in said mask, said lens having a plurality of stacked LC layers which combine to define a working area viewed by the trainee, each LC layer including a colored, host-dyed LC material and associated conductive layers on each side of said LC material, said LC material and conductive layers being located between layers of substrate, at least one conductive layer being divided into a grid of independently controllable segments, wherein said segments substantially overlap each other; and a controller for individually and collectively controlling said segments to provide view-limiting simulation of field conditions.

2. The firefighter training device of claim 1, wherein said controller therefore for controlling said segments includes an LC driver unit located in said mask housing for individually and collectively controlling said layered segments.

3. The firefighter training device of claim 2, wherein said LC driver unit receives control signals from a receiver/controller means in said mask housing.

4. The firefighter training device of claim 3, wherein said receiver/controller means includes a photometric sensor platform which senses signal patterns from a plurality of light sources said light sources being interspersed throughout a training environment, each said light source being capable of emitting independent light frequency patterns as selected by the instructor, each independent light frequency pattern transmitting an independent simulation instruction to said LC driver and said LC lens.

5. The firefighter training device of claim 3, wherein said receiver/controller means includes a electronic receiver/controller for receiving transmitted signals and controlling said LC driver unit.

6. The firefighter training device of claim 5, which further includes a separately housed transmitter/controller, wherein said receiver/controller receives signals transmitted from said transmitter/controller, said transmitter/controller having a control panel for selecting manual and automatic control signals.

7. The firefighter training device of claim 6, wherein said transmitter and receiver utilize FM radio-wave frequencies.

8. The firefighter training device of claim 6, wherein said device is powered by a battery and a backup battery, both contained in a battery compartment.

9. The firefighter training device of claim 8, which further includes a locking power switch.

10. The firefighter training device of claim 6, wherein said automatic control settings access preprogrammed control pattern sequences from at least one electronic memory storage device.

11. The firefighter training device of claim 10, wherein said electronic memory storage device containing preprogrammed control pattern sequences is located in said transmitter/controller.

12. The firefighter training device of claim 10, wherein said electronic memory storage device containing preprogrammed control pattern sequences is located in said receiver/controller.

13. The firefighter training device of claim 10, wherein multiple electronic memo storage devices containing preprogrammed control pattern sequences are located in both said transmitter/controller and said receiver/controller.

14. The firefighter training device of claim 1, wherein each said conductive layer further includes a plurality of independently controllable flame-shaped segments dispersed uniformly across said working area, said flame-shaped segments aligning with the flamed-shaped segments of each subsequent LC layer of said multi-layered lens.

15. The firefighter training device of claim 1, wherein said housing further includes at least one audio speaker placed near the trainee's ear along with associated-circuitry for producing firefighting sounds in concert with the visual simulation.

16. The firefighter training device of claim 1, wherein said multi-layered LC lens includes three LC layers with said respective LC materials host-dyed red, yellow, and undyed-white.

17. The firefighter training device of claim 1, wherein said multi-layered LC lens includes three LC layers with said respective LC materials host-dyed red, yellow, and gray.

18. The firefighter training device of claim 1, wherein said grid on each said conductive layer is formed, both vertically and horizontally, from non-linear, curve-shaped lines, said segment lines generally overlapping and appearing to repeatedly cross when viewed from the front of said LC lens of stacked, multiple LC layers.

19. The firefighter training device of claim 1, wherein said LC lens is a dynamics scattering, negative-image LC device.

20. The firefighter training device of claim 1, wherein said device worn by the trainee is in the form of a respirator mask.

21. The firefighter training device of claim 1, wherein said device worn by the trainee is in the form of glasses.

22. The firefighter training device of claim 1, wherein said device worn by the trainee is in the form of goggles.

23. The firefighter training device of claim 1, wherein said device worn by the trainee is in the form of a military helmet.

24. The firefighter training device of claim 1, which further includes an tilt sensor for sensing head movements of the trainee and related circuitry for translating the simulation appearing on said LC lens in relation to said sensed head movements, so that the simulation appears to remain proximally constant in relation to the trainee's location.

25. The firefighter training device of claim 1, wherein said controller simulates predetermined levels of field conditions and resulting trainee vision occlusion by adjusting a level to which said segments are opaque.

26. The firefighter training device of claim 1, wherein said controller collectively adjusts a level of opacity of all of said segments across the whole LC layer to simulate a field condition.

27. The fire firefighter training device of claim 1, wherein said LC lens simulates at least one of smoke and fire field conditions by adjusting a level of opacity of all of said segments across the trainee's entire field of view.

28. A firefighter training device for occluding a trainee's vision and simulating field conditions across the trainee's field of view, said device comprising:

a mask adapted to be worn by the trainee, said mask having a housing;

a single-layered, voltage controlled liquid crystal (LC) lens mounted in said mask, said lens having an LC layer defining a working area viewed by the trainee, said LC layer including an LC material and associated conductive layers on each side of said LC material, said LC material and conductive layers being located between layers of substrate, at least one conductive layer being divided into a grid of independently controllable segments, said segments being divided along substantially vertically and horizontally aligned lines; and a controller for individually and collectively controlling said segments to provide view-limiting simulation of field conditions.

29. The firefighter training device of claim 28, wherein said controller for controlling said segments includes an LC driver unit located in said mask housing for individually and collectively controlling said segments.

30. The firefighter training device of claim 28 wherein said LC driver unit receives control signals from a receiver/controller means in said mask housing.

31. The firefighter training device of claim 28, wherein said receiver/controller means includes a electronic receiver/controller for receiving transmitted signals and controlling said LC driver unit.

32. The firefighter device of claim 28, which further includes a separately housed transmitter/controller, wherein said receiver/controller receives signals transmitted from said transmitter/controller, said transmitter/controller having a control panel for selecting manual and automatic control signals.

33. The firefighter training device of claim 28, wherein said automatic control settings access preprogrammed control pattern sequences from electronic memory storage devices.

34. The firefighter training device of claim 28, wherein said receiver/controller means includes a photometric sensor platform which senses signal patterns from a plurality of light sources, said light sources being interspersed throughout a training environment, each said light source being capable of emitting independent light frequency patterns as selected by the instructor, each independent light frequency pattern transmitting an independent simulation instruction to said LC driver and said LC lens.

35. The firefighter training device of claim 28, wherein said device worn by the trainee is in the form of a respirator mask.

36. The firefighter training device of claim 28, wherein said device worn by the trainee is in the form of a.

37. The firefighter training device of claim 28, wherein said device worn by the trainee is in the form of goggles.

38. The firefighter training device in claim 28, wherein said device worn by the trainee is in the form of a military helmet.

39. The firefighter training device of claim 28, which further includes a tilt sensor for sensing head movements of the trainee and related circuitry for translating the simulation appearing on said LC lens in relation to said sensed head movements, so that the simulation appears to remain proximally constant in relation to the trainee's location.

40. The firefighter training device of claim 28, wherein the vertical and horizontal lines are non-linear, curve-shaped lines.

41. The firefighter training device of claim 28, wherein said controller simulates predetermined levels of field conditions and resulting trainee vision occlusion by adjusting a level to which said segments are opaque.

42. The firefighter training device of claim 28, wherein said controller collectively adjusts a level of opacity of all of said segments across the whole LC layer to simulate a field condition.

43. The fire firefighter training device of claim 28, wherein said LC lens simulates at least one of smoke and fire field conditions by adjusting a level of opacity of all of said segments across the trainee's entire field of view.

* * * * *